March 27, 1951      S. S. SMITH      2,546,656
DEVICE FOR MAKING PIECRUSTS
Original Filed May 17, 1945
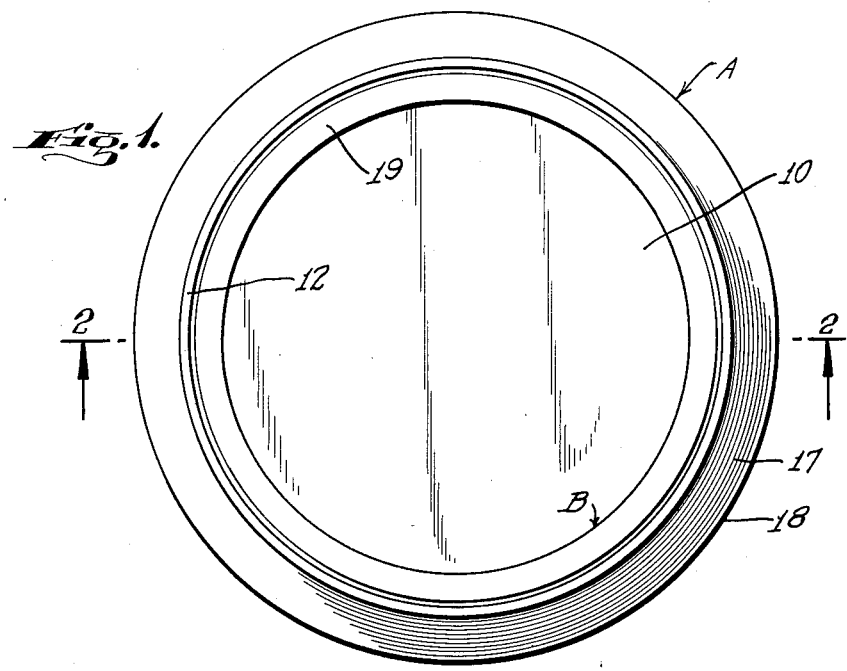
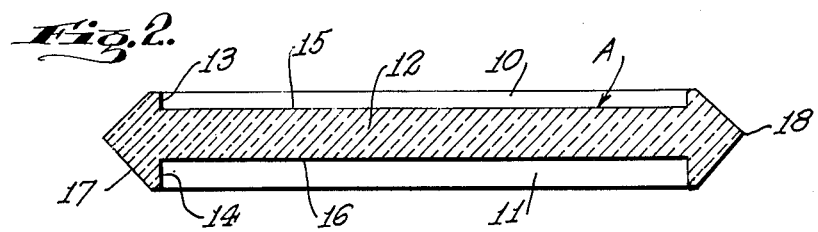
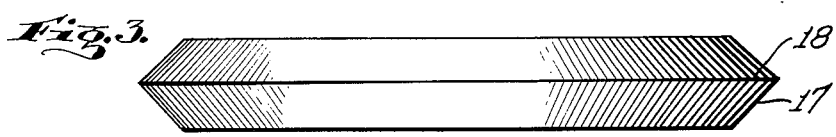
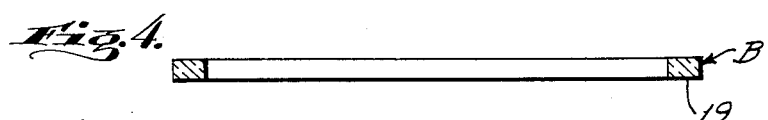
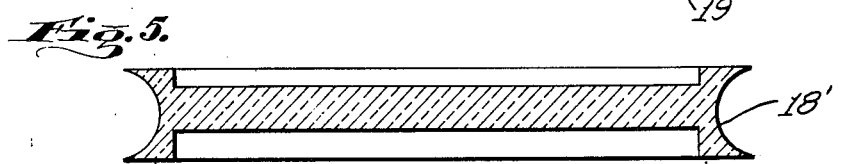
INVENTOR
*STANLEY S. SMITH*
BY
ATTORNEY Patented Mar. 27, 1951

2,546,656

UNITED STATES PATENT OFFICE 2,546,656

DEVICE FOR MAKING PIECRUSTS

Stanley S. Smith, Mount Kisco, N. Y.

Substituted for application Serial No. 594,189, May 17, 1945. This application October 6, 1949, Serial No. 119,946

2 Claims. (Cl. 107—46)

The device of the present invention consists of a device for making pie crusts comprising a mold having a shallow substantially circular cavity with a flat bottom and a low vertical peripheral side wall, the depth of the cavity being equal to the thickness of the pie crust desired to be made, the inside diameter of the cavity being substantially the same as that of the total diameters of the bottom and side crusts desired, and a flat ring having an outside diameter furnishing a loose fit of said ring inside said cavity, and having an inside dameter greater than the outsde diameter of the top pie crust desired to be made. The method of the present invention consists of the method of making the top crust of a pie having bottom and side crusts contained within a pie plate, the filling of the pie being in place therein, comprising the steps of placing the kneaded dough for said top crust in a mold provided with a substantially circular cavity with a flat bottom and low vertical side wall, the diameter of the cavity being substantially equal to the combined diameters of the bottom crust and side crusts, and the depth of the cavity being substantially equal to the thickness of the top crust desired to be made, the quantity of said kneaded dough being sufficient to fill said cavity to excess, removing the excess dough by a roller so that the remaining dough is flush with the top edge of the cavity, placing a flat ring having an outside diameter less than the diameter of the cavity and an inside diameter greater than the outside diameter of the pie plate, on top of and centered with respect to the dough layer in the cavity, inverting the mold and ring while held together upon the pie plate, centered with respect thereto and permitting the ring to drop over the pie plate and the top pie crust dough layer to settle in place on top of the pie.

Pie crusts for the usual fruit pies are about $\frac{3}{32}$ inch thick. Pie crusts for meat pies are usually twice as thick, about $\frac{3}{16}$ inch. The form of my device shown in the annexed drawings is designed for making bottom, side and top crusts of either thickness, but it will be understood that my invention is not limited to such a dual function form and includes separate devices for each thickness of crust.

The foregoing and other objects of my invention will be apparent from the following description of the invention taken in connection with the annexed drawings in which Fig. 1 is a plan view of the mold forming part of my invention, showing the flat ring used in connection therewith in plan view.

Fig. 2 is a horizontal cross section of the mold shown in Fig. 1 taken on any diameter of the mold, as line 2—2 of Fig. 1.

Fig. 3 is an external elevational view of the mold.

Fig. 4 is a vertical cross section of the ring.

Fig. 5 is a modification of the outside shape of the mold.

Fig. 6 is a perspective view of the roller used with the device.

Referring to the drawings, Figs. 1 and 2 show a mold generally indicated as A provided with two opposed cavities, 10 and 11, separated by a web 12, the parallel faces of which form the flat bottoms 15 and 16 of the two cavities respectively. The inside faces 13 and 14 of the sidewalls of cavities 10 and 11 are perpendicular to the bottoms 15 and 16. The sidewall 13 (Fig. 2) is $\frac{3}{32}$ inch in depth and the sidewall 14 is $\frac{3}{16}$ inch in depth, the cavity 10 being intended for making the crust of fruit and other pies requiring thin crusts, and cavity 11 for the more substantial crusts of meat and kindred pies. These dimensions, of course, may be varied according to the thickness of crust desired.

The sidewall of the mold is designated generally as 17. As seen in Figs. 2 and 3 in cross section it is of triangular shape protruding outwardly, 18 being the ridge, the purpose of which is to facilitate lifting the mold, as the fingertips can get under the overhung portion. Fig. 5 shows a modification of this cross sectional shape of the sidewall providing a depression 18' running the full length of the sidewall which the fingertips may engage. Many other modifications of the exterior of the sidewall 17 of the mold, including projecting handles or discontinuous depressions may be employed for the same purpose.

The top and bottom plan views of the mold are identical and Fig. 1 serves to show either view.

In Figs. 1 and 4 is shown in plan and cross section respectively, a flat ring indicated generally as B, which is used in connection with mold A as hereinafter explained. In Fig. 1, ring B is shown in place with respect to mold A. Its outside diameter is less than the inside diameter of cavity 10 or 11 so that it will loosely fit therein. An all around clearance of $\frac{1}{8}$ inch will suffice. The inside diameter of ring B is sufficiently greater than the outside of the pie plate in which the pie is to be baked to permit ring B to pass over the pie plate. An all around clearance of about $\frac{1}{4}$ inch will suffice. If a pie is to be made in the usual 9 inch pie plate the inside diameter of ring B should be 9½ inches, the outside diameter 10½ inches, the cavities 10 and 11 of mold A in this case having a diameter of 10¾ inches. The width of the ring (19, Fig. 4) should be about ½ inch.

It is not necessary that mold A and ring B should be confined in size so as to be used only with one diameter of pie plate. For instance, mold A and ring B having diameters which would permit their use in connection with a pie plate 10 inches in diameter may be used satisfactorily with a pie plate with a 9 inch diameter.

My said device is a simple one, inexpensive, durable and extremely easy to keep clean. I prefer that it be made, both mold A and ring B, of glass or of any of the various suitable plastic substitutes for glass. The use of glass or such glass substitutes would permit it to be molded and reduce the cost of manufacture. It may of course be made of wood or other materials.

The procedure for making the bottom, side and top pie crusts is as follows:

The pie crust dough is mixed and kneaded in the usual manner and a sufficient quantity of the kneaded dough is placed in cavity 10 of mold A (if a 3/32 inch crust is desired) to fill it to a slight excess. Cavity 10 will previously have been powdered with flour in the usual manner to prevent the dough from adhering to it. An ordinary roller (20, Fig. 6), of a length greater than the diameter of the mold cavity, is rolled over the top of the cavity, the roller at all times spanning and resting upon the top edges of the cavity, so as to remove any excess thickness of dough and to cut the edges of the dough layer in coincidence with the edges of the cavity and hence provides a layer with a uniform thickness of 3/32 inch. This layer will form the bottom and side crusts of the pie.

With the layer thus formed in cavity 10, the pie plate in which the pie is to be baked is placed in inverted and concentric position over cavity 10. The pie plate and mold A are then held together by the fingers and inverted. The layer will then settle into the proper position in the pie plate forming therein the bottom and side crusts. Next the filling of the pie is placed in the pie plate in the usual manner.

The next step is to form the top crust. Cavity 10 will again be powdered with flour and filled to slight excess with the kneaded dough, which is rolled in the same manner as previously described in forming the bottom crust, and the excess is thereby removed. Ring B is then placed on top of the layer in cavity 10, concentrically with respect to the cavity. Ring B and mold A are then held together by the fingers, inverted, centered over the pie plate, and thus centered placed on top of the pie plate. The dough layer is now in the proper position on top of the pie, the fingers release ring B and it will drop outside of and clear of the pie plate. The pie is now ready for baking.

In addition to removing the difficulty so commonly experienced of placing the thin dough layers in position in or on the pie plate my said device and method have the added advantages of insuring a crust of uniform thickness, and further, since the kneaded dough is subjected to less rolling pressure the crust will be more tender than in the case of those made in the usual manner.

In referring to cavities 10 and 11 of mold A as circular, it will be understood that any polysided geometric figure approximating a circle may be used.

It is obvious that changes may be made in the embodiment of my invention hereinabove described without departing from the spirit of the invention as defined in the appended claims.

Reference is made to an abandoned application previously filed by me for a Device for and Method of Making Pie Crusts, Serial No. 594,189, filed May 17, 1945, this application being intended to supersede said prior application.

I claim:

1. A device for making pie crusts comprising a mold having a shallow substantially circular cavity with a flat bottom and a low vertical peripheral side wall, the depth of the cavity being equal to the thickness of the pie crust desired to be made, the inside diameter of the cavity being substantially the same as that of the total diameters of the bottom and side crusts desired, and a flat ring having an outside diameter furnishing a loose fit of said ring inside said cavity, and having an inside diameter greater than the outside diameter of the top pie crust desired to be made.

2. A device for making the bottom, side and top crusts of a pie comprising a mold for forming the combined bottom and side crusts, having a substantially circular cavity with a flat bottom and a low vertical peripheral side wall, the depth of the cavity being equal to the thickness of the crust desired to be made, the inside diameter of the cavity being substantially the same as the combined widths of the desired bottom and side crusts, and a flat ring for use in conjunction with said mold for forming the desired top crust, having an outside diameter furnishing a loose fit of said ring inside said cavity of said mold, and having an inside diameter greater than the outside diameter of the desired top pie crust.

STANLEY S. SMITH.

REFERENCES CITED

The following references are of record in the file of this patent:

UNITED STATES PATENTS

| Number | Name | Date |
| --- | --- | --- |
| 139,217 | Webster | May 20, 1873 |
| 781,239 | Staassen | Jan. 31, 1905 |
| 1,702,144 | Weston | Feb. 12, 1929 |
| 2,230,828 | Carr | Feb. 4, 1941 |
| 2,355,307 | Kors | Aug. 8, 1944 |